(12) United States Patent
Dang et al.

(10) Patent No.: US 10,505,160 B2
(45) Date of Patent: Dec. 10, 2019

(54) MICRO-BATTERY USING GLASS PACKAGE

(71) Applicant: International Business Machines Corporation, Armonk, NY (US)

(72) Inventors: Bing Dang, Chappaqua, NY (US); Qianwen Chen, Ossining, NY (US); Yang Liu, Ossining, NY (US); Li-Wen Hung, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 15/633,301

(22) Filed: Jun. 26, 2017

(65) Prior Publication Data
US 2018/0375067 A1 Dec. 27, 2018

(51) Int. Cl.
| | |
|---|---|
| *H01M 2/00* | (2006.01) |
| *H01M 2/04* | (2006.01) |
| *H01M 10/04* | (2006.01) |
| *H01M 2/02* | (2006.01) |
| *H01M 2/08* | (2006.01) |
| *H01M 2/16* | (2006.01) |
| *H01M 10/0585* | (2010.01) |

(52) U.S. Cl.
CPC ......... *H01M 2/0417* (2013.01); *H01M 2/026* (2013.01); *H01M 2/0277* (2013.01); *H01M 2/08* (2013.01); *H01M 2/1646* (2013.01); *H01M 10/0436* (2013.01); *H01M 10/0585* (2013.01); *H01M 2220/30* (2013.01)

(58) Field of Classification Search
CPC ........... H01M 2/0417; H01M 2220/30; H01M 10/0436
See application file for complete search history.

(56) References Cited

U.S. PATENT DOCUMENTS

| | | | |
|---|---|---|---|
| 7,862,627 B2 | 1/2011 | Li et al. | |
| 8,231,998 B2 | 7/2012 | Sastry et al. | |
| 8,445,130 B2 | 5/2013 | Neudecker et al. | |
| 8,937,026 B2 | 1/2015 | Marti Nez Sanz et al. | |
| 9,029,012 B2 | 5/2015 | Neudecker et al. | |
| 2015/0155566 A1* | 6/2015 | Kim | H01M 4/9083 252/514 |
| 2017/0324068 A1* | 11/2017 | Andry | H01M 2/0207 |

OTHER PUBLICATIONS

Munakata et al., "Fabrication of 3D patterned electrodes for micro lithium-ion batteries", IOP Conference Series: Materials Science and Engineering, Published online: Jun. 22, 2011, 5 pages, vol. 18, No. 12, IOP Publishing.

Haque et al., "A 3D implantable microsystem for intraocular pressure monitoring using a glass-in-silicon reflow process", Micro Electro Mechanical Systems (MEMS), IEEE 24th International Conference IEEE, Jan. 23-27, 2011, pp. 995-998.

Marquardt et al., "Development of near hermetic silicon/glass cavities for packaging of integrated lithium micro batteries", Microsystem technologies 16.7, Jul. 2010, pp. 1119-1129, vol. 16, Issue 7, Abstract only.

\* cited by examiner

*Primary Examiner* — Cynthia H Kelly
*Assistant Examiner* — Monique M Wills
(74) *Attorney, Agent, or Firm* — Scully, Scott, Murphy & Presser, P.C.; JoAnn Kealy Crockatt (57) ABSTRACT

A pre-cut glass body is employed as a separator between an anode current collector and a cathode current collector of a micro-battery. The use of a pre-cut glass body in micro-battery applications provides excellent insulation for the micro-battery and can also result in enhanced battery reliability and lifetime.

18 Claims, 10 Drawing Sheets

MICRO-BATTERY USING GLASS PACKAGE

BACKGROUND

The present application relates to micro-battery technology, and more particularly to a micro-battery that includes a pre-cut glass body that can be used to insulate the cathode current collector of the micro-battery from the anode current collector of the micro-battery.

In recent years, there has been an increased demand for portable electronic devices such as, for example, computers, mobile phones, tracking systems, scanners, medical devices, smart watches, and fitness devices. Such portable electronic devices usually require a power supply within the device itself. Typically, a battery is used as the power supply of such portable electronic devices. Batteries must have sufficient capacity to power the portable electronic device for at least the length that the device is being used. Sufficient battery capacity can result in a power supply that is quite heavy and/or large compared to the rest of the portable electronic device. As such, smaller sized and lighter weight power supplies with sufficient energy storage are desired. Such power supplies can be implemented in smaller and lighter weight portable electronic devices.

One type of battery that is small and light weight and thus can be used in such portable electronic devices is a micro-battery. The term "micro-battery" is used throughout the present application to denote a battery having a minimum dimension from 10 microns to 1,000 microns. Micro-batteries require high energy density, small form factor, long lifetime, good reliability and low manufacturing cost. Also, micro-batteries require insulation between the anode and cathode as well as a hermetic seal that prevents electrolyte loss.

In conventional micro-batteries, a thin polymer layer is typically used to provide insulation between the anode current collector and the cathode current collector of the micro-battery. Recently, there have been some concerns regarding the insulation reliability of micro-batteries that contain such thin polymer layers. As such, there is a need to provide micro-batteries which overcomes the insulation reliability that may arise utilizing a thin polymer layer as the insulation between the anode and cathode current collectors.

SUMMARY

A pre-cut glass body is employed as a separator between an anode current collector and a cathode current collector of a micro-battery. The use of a pre-cut glass body in micro-battery applications provides excellent insulation for the micro-battery and can also result in enhanced battery reliability and lifetime.

In one aspect of the present application, a micro-battery is provided. In one embodiment, the micro-battery includes a cathode side comprising a cathode current collector, an anode side comprising an anode current collector, and a pre-cut glass body separating the cathode current collector from the anode current collector. The pre-cut glass body includes at least one vertical through hole that houses either a cathode material or an anode material of the micro-battery.

In another embodiment, the micro-battery includes a cathode side comprising a cathode current collector, an anode side comprising an anode current collector, and a pair of stacked pre-cut glass bodies separating the cathode current collector from the anode current collector. In this embodiment, one of pre-cut glass bodies includes at least one vertical through hole that houses a cathode material of the micro-battery, and another of the pre-cut glass bodies includes at least one vertical through hole that houses an anode material of the micro-battery.

In another aspect of the present application, a method of forming a micro-battery is provided. In one embodiment, the method includes providing a cathode side comprising a cathode current collector, and an anode side comprising an anode current collector, wherein at least one of the cathode side and the anode side includes a pre-cut glass body having at least one vertical through hole that houses a battery material. Next, the cathode side is bonded to the anode side.

DETAILED DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

The present application provides micro-batteries in which at least one pre-cut glass body (i.e., substrate) is used as a separator between the anode current collector and the cathode current collector. The at least one pre-cut glass body includes at least one vertical through hole that is filled with a battery material (i.e., cathode material or anode material). FIGS. 1-11A and 11B illustrates a first embodiment of the present application, FIGS. 12-18 represents a second embodiment, and FIG. 19 represents a third embodiment. The use of a pre-cut glass body in such applications provides excellent insulation for the micro-battery and can also result in enhanced battery reliability and lifetime.

Figure 1:
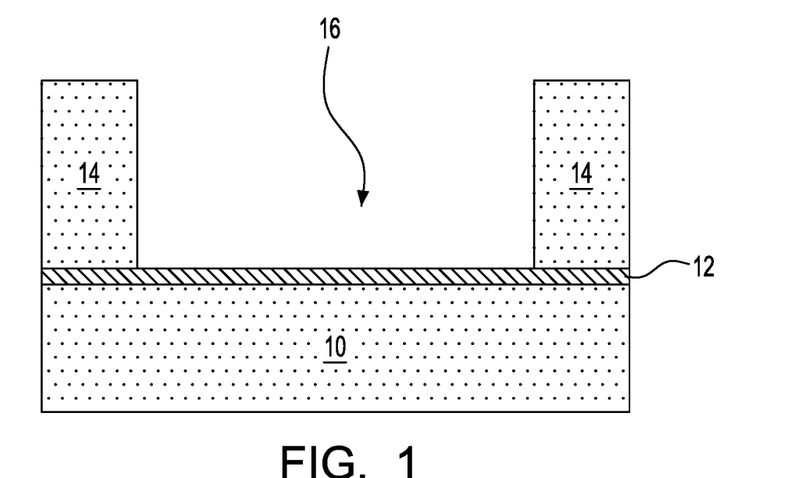
FIG. 1 is a cross sectional view of a first exemplary structure which includes a pre-cut glass body having a vertical through hole located therein and adhered to a surface of a first handler substrate that can be employed in one embodiment of the present application for providing a cathode side of a micro-battery.

Referring first to FIG. 1, there is illustrated a first exemplary structure that can be employed in one embodiment of the present application for providing a cathode side of a micro-battery. The first exemplary structure shown in FIG. 1 includes a pre-cut glass body 14 having a vertical through hole 16 located therein. The pre-cut glass body 14 is adhered to a surface of a first handler substrate 10 by a releasable adhesive layer 12. Although the present application describes and illustrates a single vertical through 16 present in the pre-cut glass body 14, the present application also contemplates embodiments in which a plurality of vertical through holes are formed into the glass substrate. In such an embodiment, each vertical through hole of the plurality of vertical through holes is not in direct physical contact with another of the vertical through holes. Such an embodiment may be used in providing an array of laterally spaced apart micro-batteries in accordance with the present application.

The pre-cut glass body 14 includes a glass substrate, such as, for example, a glass wafer or glass panel, in which a vertical through hole 16 is formed through an entirety of the glass substrate; as would be seen from a top down view, the vertical through hole 16 is entirely surrounded by a remaining portion of the glass substrate. In some embodiments, the pre-cut glass body 14 is ring shaped. The glass substrate that can be used in providing the pre-cut glass body 14 can a thickness from 10 microns to 1000 microns. Other thicknesses that are lesser than, or greater than, the aforementioned thickness range may also be employed as the thickness of the glass substrate.

The glass substrate that can be used in providing the pre-cut glass body 14 may be a wafer or a panel substrate, having a diameter from 2 inches to 12 inches for a wafer substrate, or a width and length from 10 millimeters to 1000 millimeters for a panel substrate. Other lengths and/or widths that are lesser than, or greater than, the aforementioned ranges may also be employed as the length and/or width of the glass substrate.

Prior to forming the vertical through hole 16 into the glass substrate, the top and bottom surfaces of the glass substrate may be polished utilizing any conventional glass polishing process that is well known to those skilled in the art. The vertical through hole 16, which extends from the top surface of the glass substrate to the bottom surface of the glass substrate, can be formed utilizing techniques that are well known for forming a vertical through hole into a glass substrate. For example, the vertical through hole 16 may be formed by micro-machining, laser cutting or by lithography and etching. The vertical through hole may have any shape. In one example, the shade of the through hole is a cylinder. In such an embodiment, the vertical though hole 16 may have a diameter from 1 μm to 100 μm.

The first handler substrate 10 that can be used in the present application may be composed of any handler material including, but not limited to, glass or silicon. The first handler substrate 10 that may be used in the present application may have a thickness from 700 microns to 780 microns. Other thicknesses that are lesser than, or greater than, the aforementioned thickness values may also be used as the thickness of the first handler substrate 10.

Releasable adhesive layer 12 is then applied to an exposed surface of the first handler substrate 10 utilizing any deposition technique that is well known in the art. For example, releasable adhesive layer 12 may be formed by spin-coating, squeegee coating, brush coating, blade coating or chemical vapor deposition. The releasable adhesive layer 12 is a contiguous layer that may have a thickness from 100 nm to 10 µm. Other thickness that are lesser than, or greater than, the aforementioned thickness range may also be employed as the thickness of the releasable adhesive layer 12. Releasable adhesive layer 12 may include any chemical or thermal decomposable adhesive material such as, for example, an epoxy resin, a polyimide or benzocyclobutene (BCB).

After applying the releasable adhesive layer 12 to the first handler substrate 10, the pre-cut glass body 14 is bonded to the first handler substrate 10. Bonding of the pre-cut glass body 14 to the first handler substrate 10 includes bringing the pre-cut glass body 14 into intimate contact with the releasable adhesive layer 12 that is present on the first handler substrate 10. In some embodiments, the bonding may further include heating the resultant structure so as to cure the adhesive material that provides the releasable adhesive layer 12. Heating is performed below the decomposition temperature of adhesive material that provides the releasable adhesive layer 12. In one embodiment, the heating is performed at a temperature from 60° C. to 200° C. Heating, i.e., curing, provides an adhesive material bond between the pre-cut glass body 14 and the first hander substrate 10.

Figure 2:
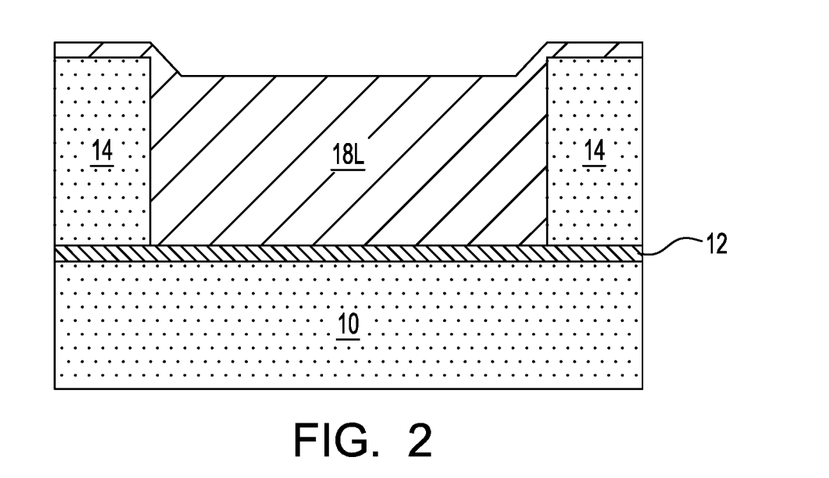
FIG. 2 is a cross sectional view of the first exemplary structure of FIG. 1 after forming a sacrificial material within the entirety of the vertical through hole present in the pre-cut glass body.

Referring now to FIG. 2, there is illustrated the first exemplary structure of FIG. 1 after forming a sacrificial material 18L within the entirety of the vertical through hole 16 present in the pre-cut glass body 14. In some embodiments, and as shown, a portion of the sacrificial material 18L may be formed outside the vertical through hole 16. The portion of the sacrificial material 18L that is present outside the vertical through hole 16 (so called 'overburden sacrificial material') may extend onto an exposed surface of the pre-cut glass body 14.

The sacrificial material 18L may be composed of any material having an etch selectivity that differs from the pre-cut glass body 14, the adhesive layer 12, and metal layers to be subsequently formed. In one embodiment, the sacrificial material 18L is composed of a photoresist material or a dielectric material such as, for example, silicon dioxide. The sacrificial material layer 18L may be formed by a deposition process including, but not limited to, spin-coating, chemical vapor deposition, or plasma enhanced chemical vapor deposition. The sacrificial material 18L has a thickness that at least fills up the entirety of the vertical through hole 16.

Figure 3:
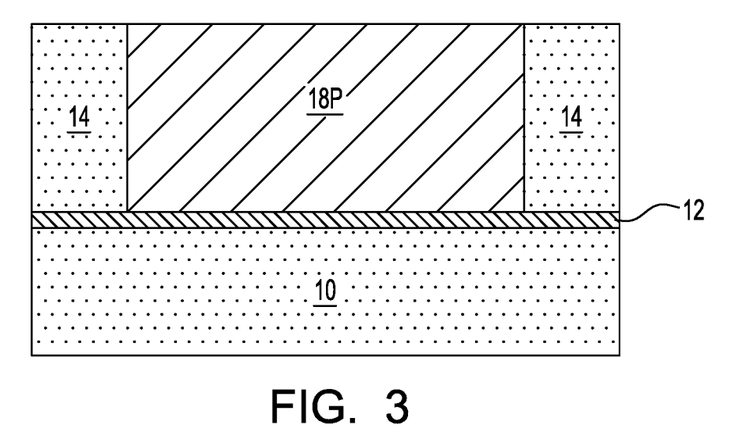
FIG. 3 is a cross sectional view of the first exemplary structure of FIG. 2 after removing overburden sacrificial material that is located outside and above the vertical through hole present in the pre-cut glass body.

Referring now to FIG. 3, there is illustrated the first exemplary structure of FIG. 2 after removing the overburden sacrificial material that is located outside and above the vertical through hole 16 present in the pre-cut glass body 14. The remaining sacrificial material present in the vertical through hole 16 may be referred to herein as a sacrificial material plug 18P. The removal of the overburden sacrificial material that is located outside and above the vertical through hole 16 present in the pre-cut glass body 14 may be performed utilizing a planarization process such as, for example, chemical mechanical planarization. In some embodiments, this step may be omitted. The sacrificial material plug 18P has a topmost surface that is coplanar with an exposed surface of the pre-cut glass body 14.

Figure 4:
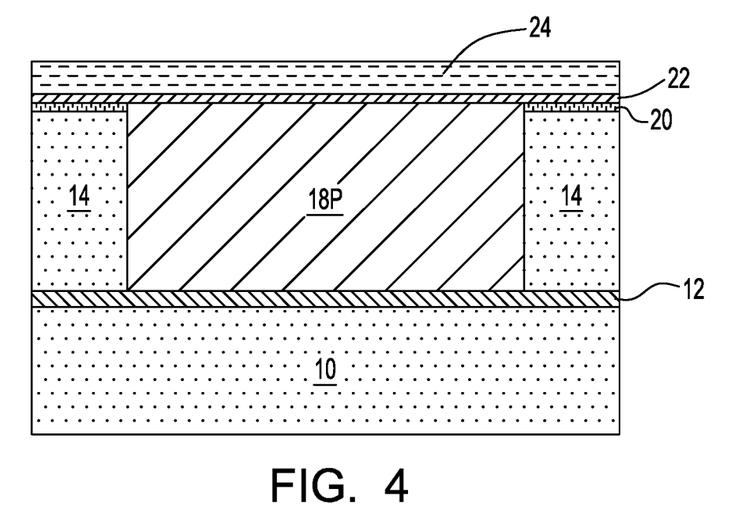
FIG. 4 is a cross sectional view of the first exemplary structure of FIG. 3 after forming an adhesion metal layer on physically exposed surfaces of one side of the pre-cut glass body, and thereafter forming a diffusion barrier layer and a cathode current collector layer.

Referring now to FIG. 4, there is illustrated the first exemplary structure of FIG. 3 after forming an adhesion metal layer 20 on physically exposed surfaces of one side of the pre-cut glass body 14, and thereafter forming a diffusion barrier layer 22 and a cathode current collector 24. In some embodiments, the diffusion barrier layer 22 may be omitted.

The adhesion metal layer 20 that is employed in the present application may include a metallic adhesion material such, as for example, titanium (Ti), a titanium tungsten (TiW) alloy, or tantalum (Ta). The adhesion metal layer 20 may be formed onto the physically exposed surfaces of one side of the pre-cut glass body 14 utilizing any deposition process including, for example, chemical vapor deposition, plating or sputtering. The adhesion metal layer 20 may have a thickness from 100 nm to 10 µm. Other thicknesses that are lesser than, or greater than, the aforementioned thickness range may also be employed as the thickness of the adhesion metal layer 20.

Next, a metal stack containing the diffusion barrier layer 22 and the cathode current collector layer 24 is formed on the exposed surfaces of the adhesion metal layer 20 and the sacrificial material plug 18P. The diffusion barrier layer 22 of the metal stack may include, but it not limited to, tantalum nitride (TaN) or titanium nitride (TiN); the diffusion barrier material typically differs in composition from both the adhesion metal layer 20 and the cathode current collector layer 24. The diffusion barrier layer 22 may be formed utilizing a deposition process such as, for example, chemical vapor deposition, plating, or sputtering. The diffusion barrier layer 22 may have a thickness from 1 nm to 100 nm. Other thicknesses that are lesser than, or greater than, the aforementioned thickness range may also be employed as the thickness of the diffusion barrier layer 22.

The cathode current collector layer 24 may include any conductive metallic material such as, for example, titanium (Ti), platinum (Pt), nickel (Ni), copper (Cu). The cathode current collector layer 24 may be formed utilizing a deposition process such as, for example, chemical vapor deposition, plating, or sputtering. In one example, the cathode current collector layer 24 may include a metallic stack of Ti/Ni/Cu. In some embodiments, the cathode current collector layer 24 is a thin layer whose thickness is typically from 1 µm to 10 µm.

Figure 5:
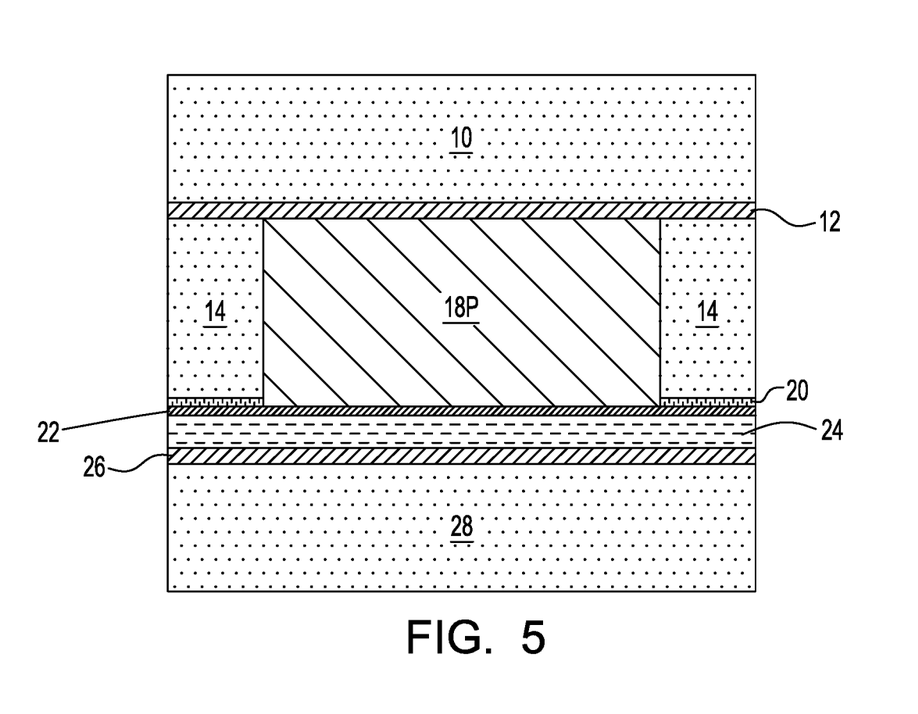
FIG. 5 is a cross sectional view of the first exemplary structure of FIG. 4 after bonding the cathode current collector layer to a second handler substrate and flipping the structure 180°.

Referring now to FIG. 5, there is illustrated the first exemplary structure of FIG. 4 after bonding the cathode current collector layer 24 to a second handler substrate 28 and flipping the structure 180°. The second handler substrate 28 may include one of the handler materials mentioned above for the first handler substrate 10. In one embodiment, the first and second handler substrates (10, 28) are composed of a same handler material, i.e. silicon or glass. The second handler substrate 28 is bonded to the cathode current collector layer 24 via a releasable adhesive layer 26 which is located on a surface of the second handler substrate 28.

Releasable adhesive layer 26 may include one the chemical or thermal decomposable adhesive materials mentioned above for releasable adhesive layer 12. In one embodiment, the releasable adhesive layers (12, 26) are composed of a same chemical or thermal decomposable adhesive material such as, for example, BCB. Releasable adhesive layer 26 may be formed onto a physically exposed surface of the second handler substrate 28 prior to bonding utilizing one of the techniques mentioned above for forming the releasable adhesive layer 12 to the first handler substrate 10. Releasable adhesive layer 26 may have a thickness within range mentioned above for releasable layer 12.

Bonding of the second handler substrate 28 to the cathode current collector layer 24 may be performed utilizing the technique mentioned above for bonding the pre-cut glass body 14 to the first handler substrate 10. That is, bonding may be performed via intimately contacting the releasable adhesive layer 24 that is present on a surface of the second handler substrate 28 with a physically exposed surface of the cathode current collector layer 24. Heating may be optionally employed during the bonding process.

Figure 6:
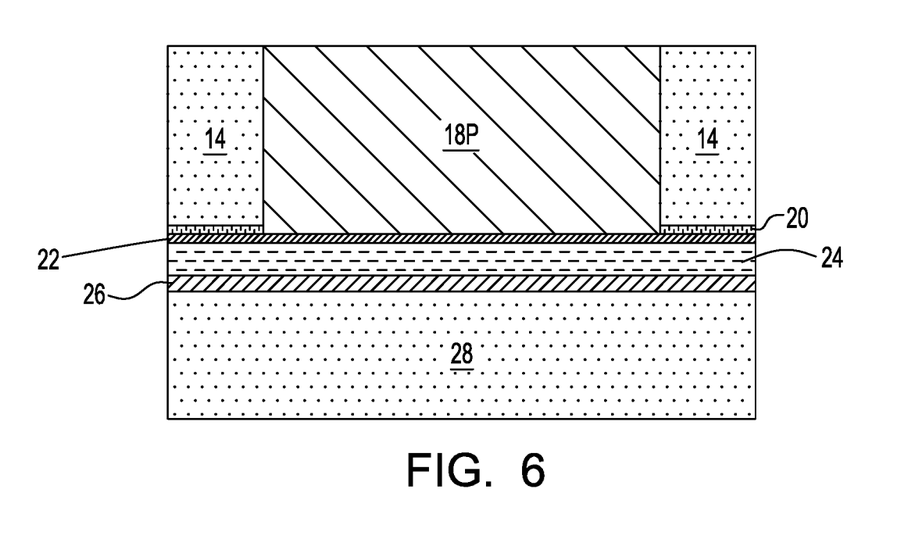
FIG. 6 is a cross sectional view of the first exemplary structure of FIG. 5 after removing the first handler substrate.

Referring now to FIG. 6, there is illustrated the first exemplary structure of FIG. 5 after removing the first handler substrate 10. The removal of the first handler substrate 10 includes a release process in which the releasable adhesive layer 12 is first removed utilizing either a decomposition method (such as, for example, thermal decomposition or laser ablation) or a chemical method such as, for example, wet etching. Removing the releasable adhesive layer 20 also removes the first handler substrate 10.

Figure 7:
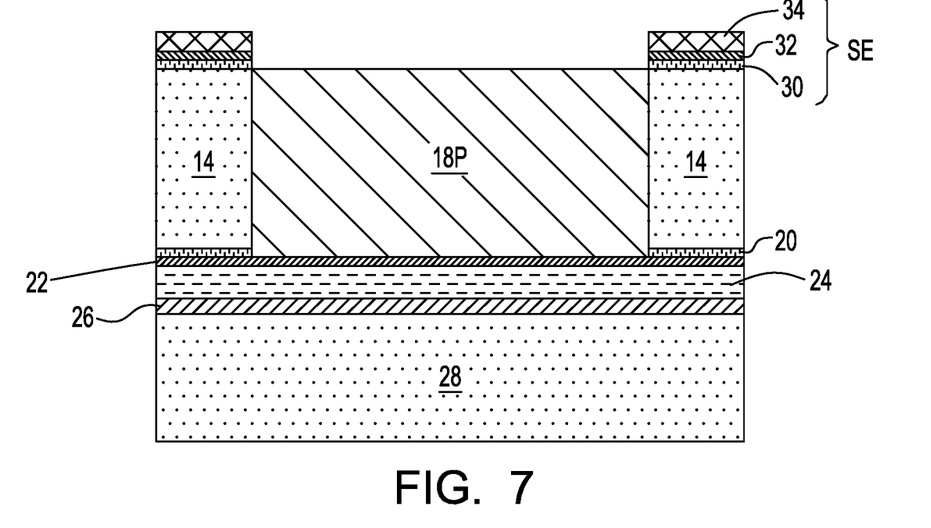
FIG. 7 is a cross sectional view of the first exemplary structure of FIG. 6 after forming a metallic sealing element on physically exposed surfaces of another side of the pre-cut glass body.

Referring now to FIG. 7, there is illustrated the first exemplary structure of FIG. 6 after forming a metallic sealing element, SE, on physically exposed surfaces of another side of the pre-cut glass body 14. In some embodiments, the metallic sealing element, SE, is ring shaped.

In one embodiment, metallic sealing element, SE, may include, a stack of an adhesion metal layer 30, a diffusion barrier layer 32 and a fusible metal or metal alloy layer 34. In some embodiments, the diffusion barrier layer 32 may be omitted.

Adhesion metal layer 30 may include one of the metallic materials mentioned above for adhesion metal layer 20. Adhesion metal layer 30 may be formed utilizing one of the techniques mentioned above for forming adhesion metal layer 20. Adhesion metal layer 30 may have a thickness within the range mentioned above for adhesion metal layer 20. Diffusion barrier layer 32 may include one of the diffusion barrier mentioned above for forming diffusion barrier layer 22, and it may be formed utilizing one of the techniques mentioned above for forming diffusion barrier layer 22. Diffusion barrier layer 32 may have a thickness within the range mentioned above for diffusion barrier layer 22.

The fusible metal or metal alloy layer 34 may include, but is not limited to, gold, tin, indium or combinations thereof. The fusible metal or metal alloy may be formed by a deposition process such as, for example, plating or sputtering.

Figure 8:
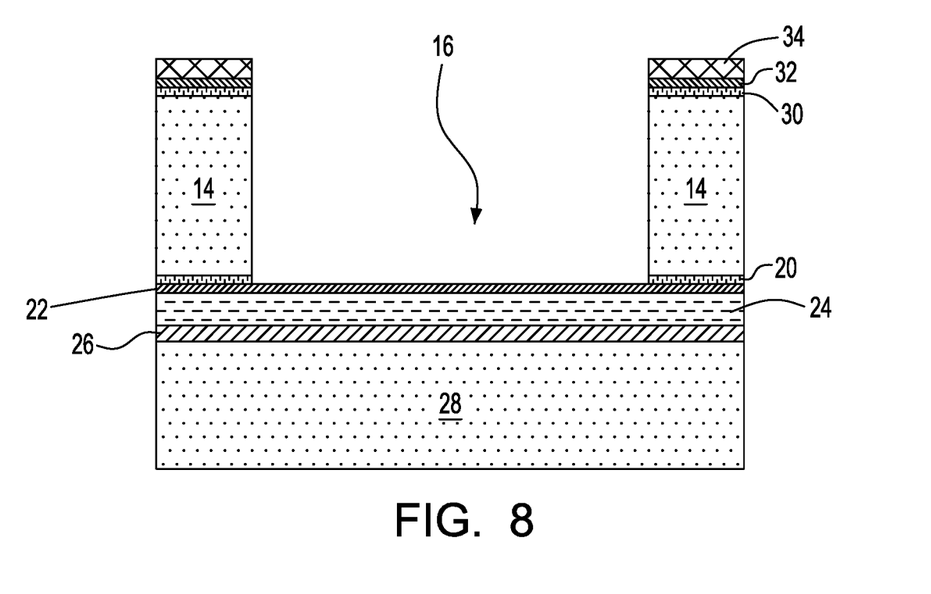
FIG. 8 is a cross sectional view of the first exemplary structure of FIG. 7 after removing remaining sacrificial material from the vertical through hole present in the pre-cut glass body.

Referring now to FIG. 8, there is illustrated the first exemplary structure of FIG. 7 after removing the sacrificial material plug 18P from the vertical through hole 16 present in the pre-cut glass body 14. The sacrificial material plug 18P may be removed utilizing any removal process that is selective in removing the material of the sacrificial material plug 18P. The removal of the sacrificial material plug 18P may include an etching process or an ashing process.

Figure 9:
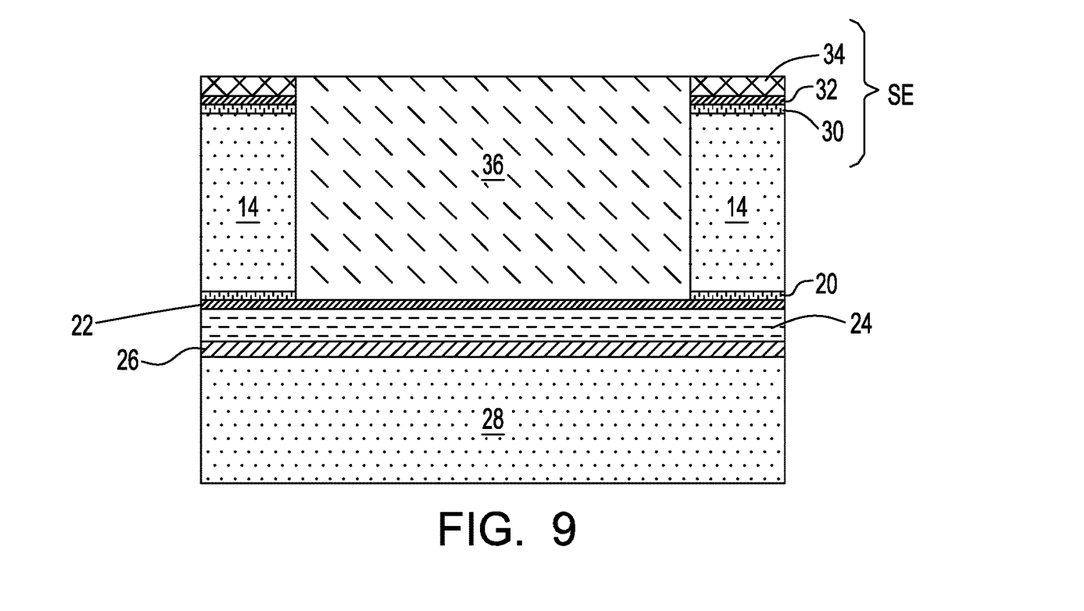
FIG. 9 is a cross sectional view of the first exemplary structure of FIG. 8 after forming a cathode material in the vertical through hole present in the pre-cut glass body.

Referring now to FIG. 9, there is illustrated the first exemplary structure of FIG. 8 after forming a cathode material 36 in the vertical through hole 16 present in the pre-cut glass body 14. As is shown, a surface of the cathode material 36 directly contacts a physically exposed portion of the diffusion barrier layer 22.

The cathode material 36 may include manganese dioxide ($MnO_2$), nickel hydroxide, or any other known material that can serve as a positively charged terminal. In some embodiments, the cathode material 36 may be combined with a binder. The cathode material 36 can be formed utilizing a well known deposition process including, for example, chemical vapor deposition, sputtering or plating.

At this stage of the process, the second handler substrate 28 may be released from the first exemplary structure utilizing the same technique mentioned above for removing the first hander substrate 10 such that a surface of the cathode current collector 24 is exposed.

Figure 10:
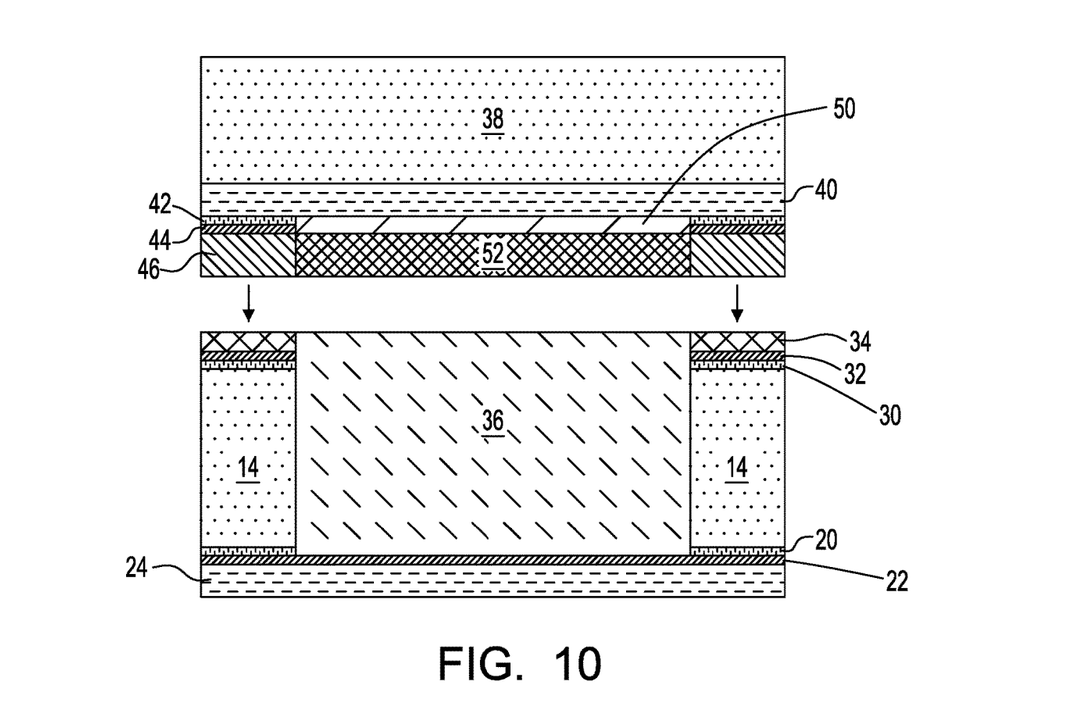
FIG. 10 is a cross sectional view during an initial stage of bonding the first exemplary structure of FIG. 9 to a second exemplary structure which represents the anode side of a micro-battery.

Referring now to FIG. 10, there is illustrated an initial stage of bonding the first exemplary structure of FIG. 9 to a second exemplary structure which represents the anode side of a micro-battery. The second exemplary structure may be formed prior to, concurrently with, or after forming the first exemplary structure. The initial stage of bonding includes positioning and aligning one of the structures over another of the structures. In the illustrated embodiment, the second exemplary structure is positioned and aligned over the first exemplary structure.

The second exemplary structure includes a third mechanical handler substrate 38, an anode current collector 40, adhesion metal layer 42, diffusion barrier layer 44 and a seal structure 46. The second exemplary structure further includes anode material 50, and electrolyte separator material 52 located within a cavity located between the material stack of the adhesion metal layer 42, the diffusion barrier layer 44 and the seal structure 46. In some embodiments, diffusion barrier layer 44 is omitted.

The third mechanical handler substrate 38 may include one of the handler materials mentioned above for the first handler substrate 10. The anode current collector layer 40, which is formed on an exposed surface of the third mechanical handler substrate 38, may include any conductive metallic material such as, for example, titanium (Ti), platinum (Pt), nickel (Ni), copper (Cu). The anode current collector layer 40 may be formed utilizing a deposition process such as, for example, chemical vapor deposition, or chemical vapor deposition, or sputtering. In one example, the anode current collector layer 40 may include a layer of Ti. In some embodiments, the anode current collector layer 40 is a thin layer whose thickness is typically from 1 μm to 10 μm.

The adhesion metal layer 42 may include one of the metallic materials mentioned above for adhesion metal layer 20. Adhesion metal layer 42 may be formed utilizing one of the techniques mentioned above for forming adhesion metal layer 20. Adhesion metal layer 42 may have a thickness within the range mentioned above for adhesion metal layer 20. Diffusion barrier layer 44 may include one of the diffusion barrier mentioned above for forming diffusion barrier layer 22, and it may be formed utilizing one of the techniques mentioned above for forming diffusion barrier layer 22. Diffusion barrier layer 44 may have a thickness within the range mentioned above for diffusion barrier layer 22.

The seal structure 46 may include any material that can serve as a seal for a micro-battery. In one embodiment, the seal structure 46 may be composed of a polymeric material. In yet another embodiment, the seal structure 46 may be composed of a metal such as, for example, In, Sn, Au, and/or Cu. The seal structure 46 has a same shape as the metallic sealing element, SE, defined above. In some embodiments, the seal structure 46 may be formed by deposition such as, for example, plating or sputtering.

The anode material 50 may include zinc (Zn), a stack of indium (In)/bismuth (Bi)/zinc(Zn) or any other material that can serve as the negative terminal of the battery. The anode material 50 can be formed utilizing well known deposition process including, for example, chemical vapor deposition, sputtering or plating.

The electrolyte separate material 52 contains an electrolyte. The electrolyte separator material 52 may include one or more of a flexible porous material, a gel, or a sheet that is composed of cellulose, cellophane, polyvinyl acetate (PVA), PVA/cellulous blends, polyethylene (PE), polypropylene (PP) or a mixture of PE and PP.

Exemplary electrolytes that can be soaked into the electrolyte separate material may include at least one of ammonium chloride, an aqueous salt solution such as, for example, KOH, zinc chloride or zinc acetate with an additive such as ZnO. In one embodiment, the electrolyte has a pH in a range from 3 to 7.

In some embodiments, the electrolyte separate material 52 is soaked in an electrolyte in a wet assembly. In other embodiments, the electrolyte separator material 52 may to treated to render it hydrophilic so that the electrolyte separator material 52 can be filled with an electrolyte through a fill port in a dry assembly.

Figure 11A:
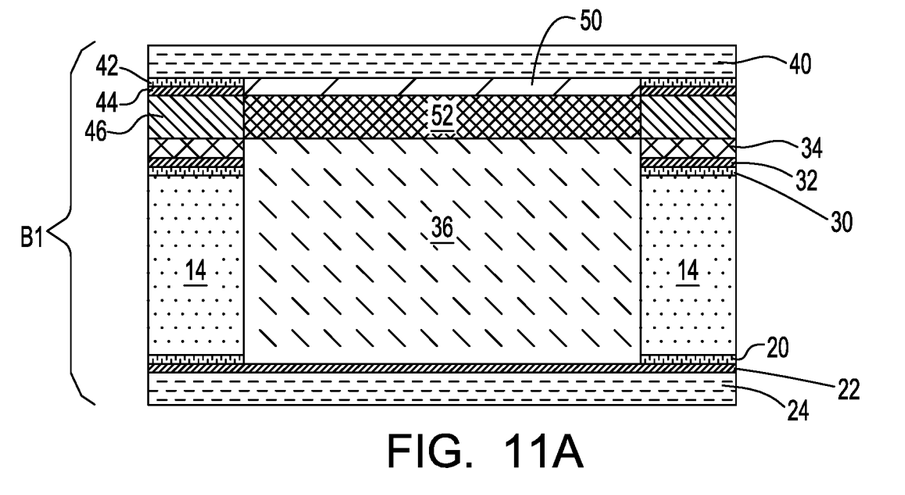
FIG. 11A is a cross sectional view after bonding the first exemplary structure to the second exemplary structure to provide a micro-battery in accordance with an embodiment of the present application.

Referring now to FIG. 11A, there is illustrated a micro-battery B1 in accordance with an embodiment of the present application which is formed after bonding the first exemplary structure shown in FIG. 10 to the second exemplary structure shown in FIG. 10. Bonding of the two exemplary structures may be performed by bringing the two exemplary structures into intimate contact with each other such that the metallic sealing element, SE, contacts the seal structure 46. Bonding is then performed utilizing a low temperature (i.e., typically less than 120° C.) bonding process such as, for example, cold welding, thermo-compression bonding or adhesive bonding. After bonding, the third mechanical handler substrate 38 may be released from the bonded structure, i.e., micro-battery, B1, utilizing any technique that is capable of removing the third hander substrate 38 from the anode current collector 40 such that a surface of the anode current collector 40 is exposed.

Figure 11B:
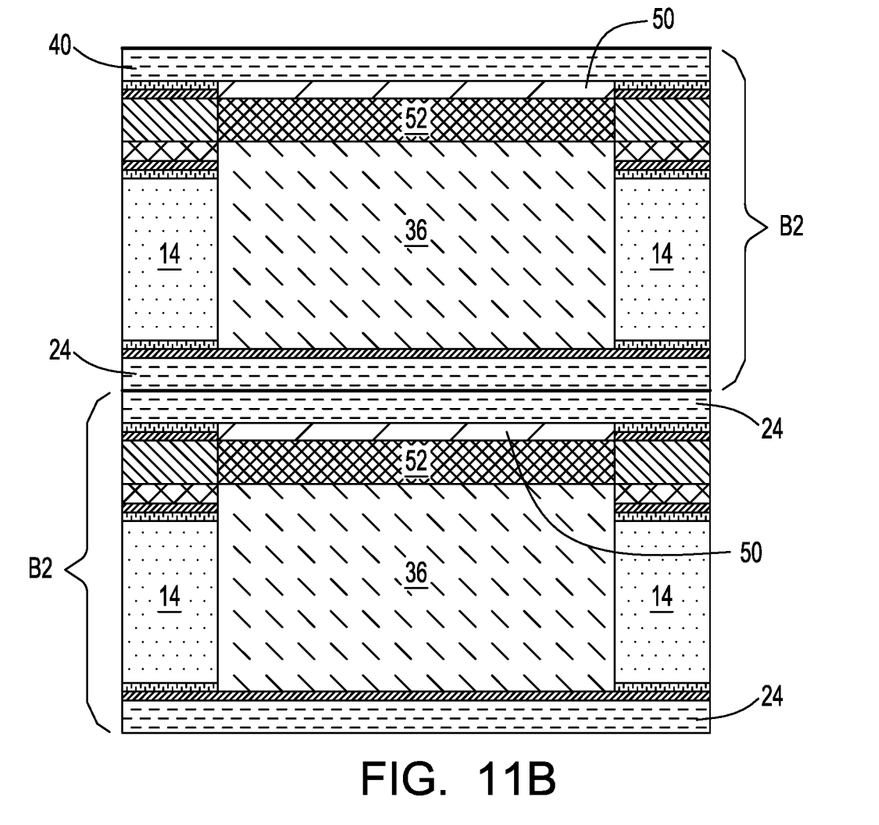
FIG. 11B is a cross sectional view of the micro-battery of FIG. 11A after stacking at least one other micro-battery in accordance with the present application thereon.

Referring now to FIG. 11B, there is illustrated the micro-battery, B1, of FIG. 11A after stacking at least one other micro-battery, B2, thereon. In the embodiment illustrated, micro-battery, B2, includes the same elements as micro-battery, B1.

Figure 12:
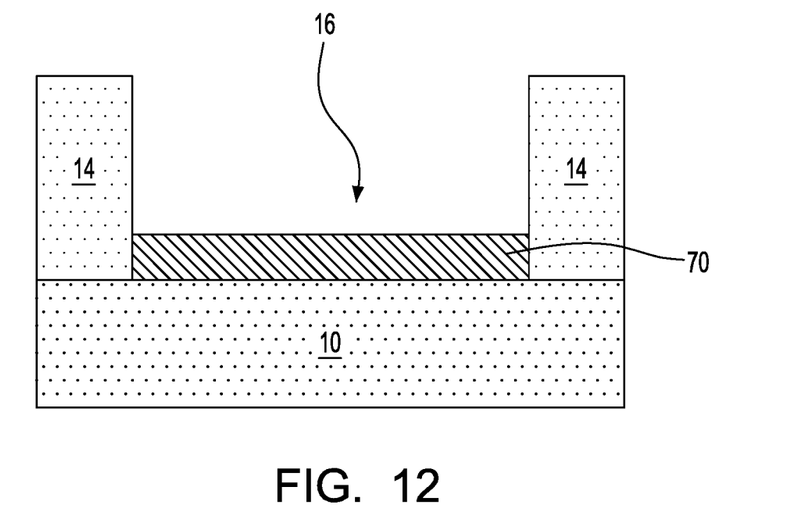
FIG. 12 is a cross sectional view of another first exemplary structure including a pre-cut glass body having a vertical through hole located therein that is adhered to a surface of a first handler substrate that can be employed in another embodiment of the present application.

Referring now to FIG. 12, there is illustrated another first exemplary structure of a pre-cut glass body 14 having a vertical through hole 16 located therein that is adhered to a surface of a first handler substrate 10 that can be employed in another embodiment of the present application. In this embodiment, pre-cut glass body 14 and the first handler substrate 10 are the same as described above in regard to FIG. 1 of the present application. In this embodiment, the pre-cut glass body 14 is adhered to the first handler substrate 10 by providing an adhesive material 70 on the first handler substrate 10, then contacting the pre-cut glass body 14 to the adhesive material, and then partially curing the adhesive material 70.

Adhesive material 70 may include any polymeric adhesive material such as, for example, SU8 (an epoxy photoresist), dry film, PDMA (poly(dimethylacryalmide), or PI (polyimide). Adhesive material 70 may be applied to the surface of the first handler substrate 10 utilizing a deposition technique well known in the art. Partially curing may be performed by electron beam treatment, or heat treatment. Partially curing some cross-linking of the polymeric chains of the adhesive material.

Figure 13:
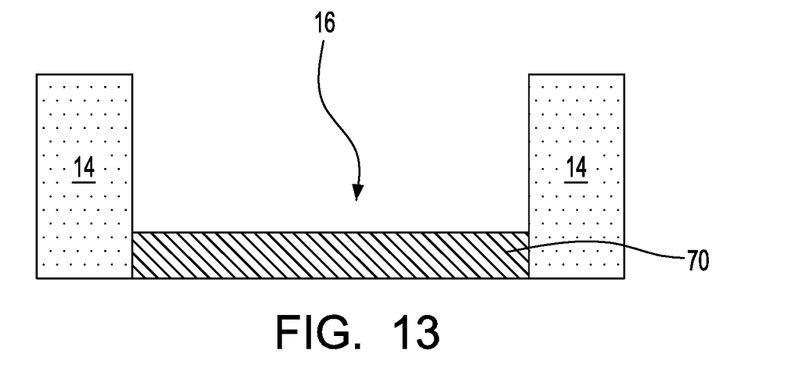
FIG. 13 is a cross sectional view of the another first exemplary structure of FIG. 12 after removing the first handler substrate.

Referring now to FIG. 13, there is illustrated the another first exemplary structure of FIG. 12 after removing the first handler substrate 10. The first handler substrate 10 may be removed utilizing any removal process that is well known to those skilled in the art.

Figure 14:
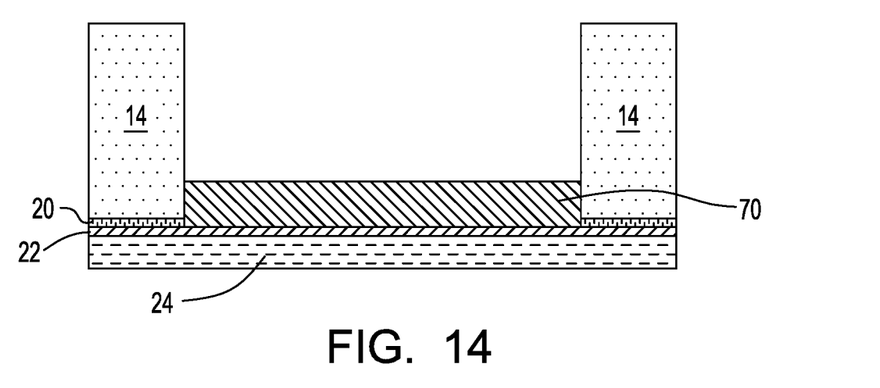
FIG. 14 is a cross sectional view of the another first exemplary structure of FIG. 13 after forming an adhesion metal layer on physically exposed surfaces of one side of the pre-cut glass body, and thereafter forming a diffusion barrier layer and a cathode current collector layer.

Referring now to FIG. 14, there is illustrated the another first exemplary structure of FIG. 13 after forming an adhesion metal layer 20 on physically exposed surfaces of one side of the pre-cut glass body 14, and thereafter forming a diffusion barrier layer 22 and a cathode current collector layer 24. The adhesion metal layer 20, the diffusion barrier layer 22 and the cathode current collector layer 24 that can be employed in this embodiment include materials as defined above in providing each of the same layers to the first exemplary structure shown in FIG. 4 of the present application. The adhesion metal layer 20, the diffusion barrier layer 22 and the cathode current collector layer 24 that can be employed in this embodiment can be formed and have thicknesses as defined above in providing each of the same layers to the first exemplary structure shown in FIG. 4 of the present application. In some embodiments, the diffusion barrier layer 22 is omitted.

Figure 15:
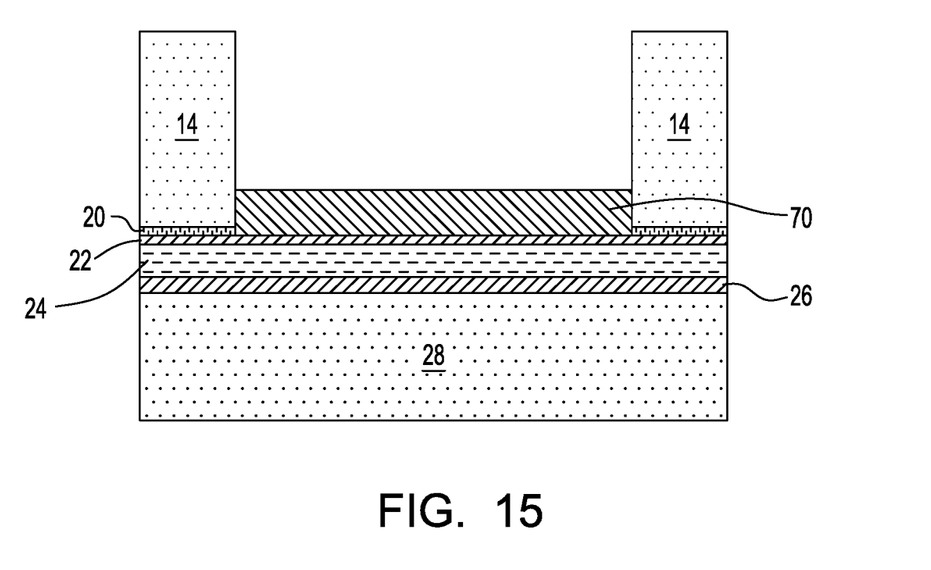
FIG. 15 is a cross sectional view of the another first exemplary structure of FIG. 14 after bonding the cathode current collector layer to a second handler substrate.

Referring now to FIG. 15, there is illustrated the exemplary structure of FIG. 14 after bonding the cathode current collector layer 24 to a second handler substrate 28. The second handler substrate 28 may include one of the handler materials mentioned above for the first handler substrate 10. In one embodiment, the first and second handler substrates (10, 28) are composed of a same handler material, i.e. silicon or glass.

The second handler substrate 28 is bonded to the cathode current collector layer 24 via a releasable adhesive layer 26 which is located on a surface of the second handler substrate 28. The releasable adhesive layer 26 that can be employed in this embodiment include one of the materials mentioned above for releasable adhesive layer 26 shown in FIG. 5 of the present application. The releasable adhesive layer 26 that can be employed in this embodiment can be formed and have thicknesses as defined above in providing the same layer to the first exemplary structure shown in FIG. 5 of the present application.

Bonding may be performed via intimating contacting the releasable adhesive layer 26 that is present on a surface of the second handler substrate 28 with a physically exposed surface of the cathode current collector layer 24. Heating may be optionally employed during the bonding process.

Figure 16:
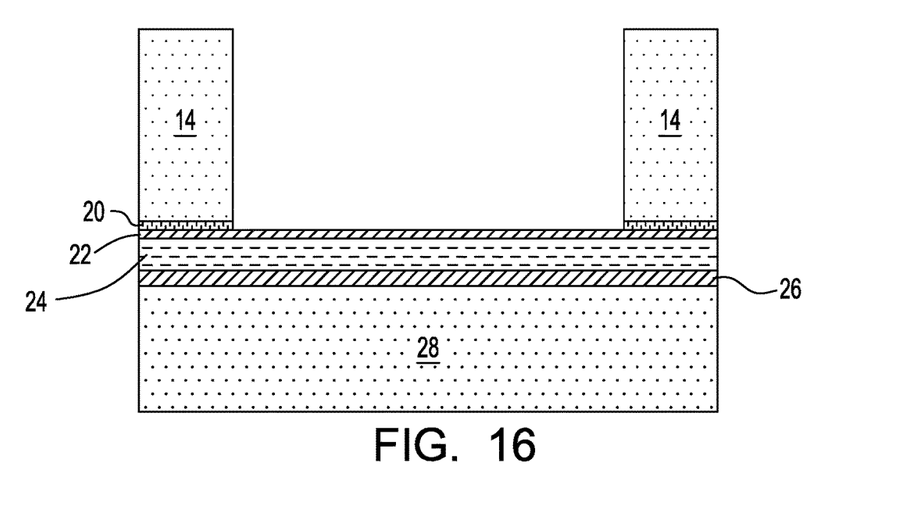
FIG. 16 is a cross sectional view of the another first exemplary structure of FIG. 15 after removing the adhesive material from the vertical through hole.

Referring now to FIG. 16, there is illustrated the another first exemplary structure of FIG. 15 after removing the adhesive material 70 from the vertical through hole 16. The adhesive material 70 may be removed from the vertical through hole 16 that is present in the pre-cut glass body 14 utilizing any removal process that selectively removes adhesive material 70 relative to the other element shown in FIG. 16.

Figure 17:
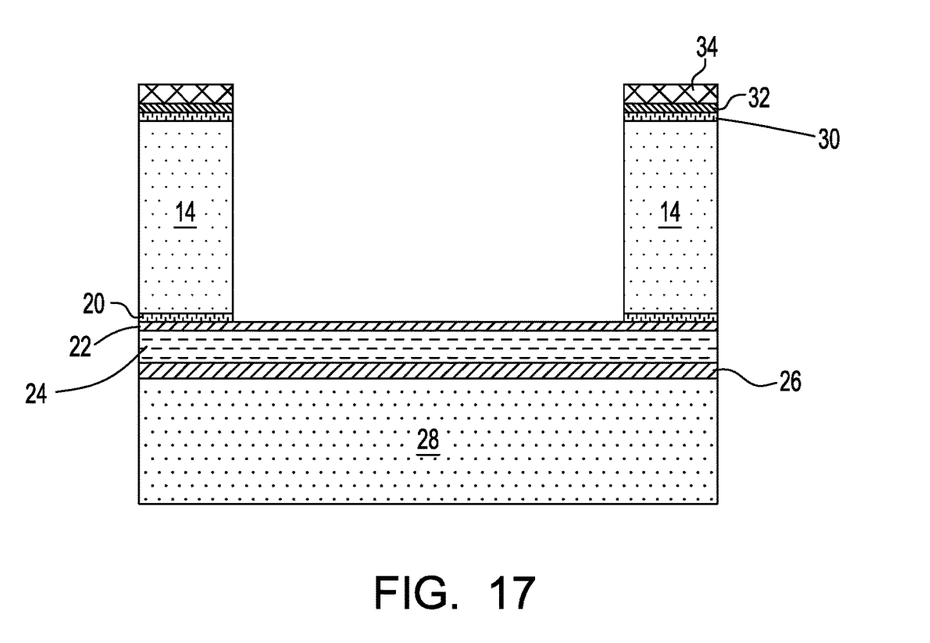
FIG. 17 is a cross sectional view of the another first exemplary structure of FIG. 16 after forming a metallic sealing element on physically exposed surfaces of another side of the pre-cut glass body.

Referring now to FIG. 17, there is illustrated the another first exemplary structure of FIG. 16 after forming a metallic sealing element, SE, on physically exposed surfaces of another side of the pre-cut glass body 14. The metallic sealing element, SE, of this embodiment can be formed by deposition and patterning. In some embodiments, the sealing element, metallic SE, of this embodiment is ring shaped.

In one embodiment, metallic sealing element, SE, of this embodiment may include, a stack of an adhesion metal layer 30, a diffusion barrier layer 32 and a sealant layer 34 as defined above in providing metallic sealing element, SE, to the first exemplary structure shown in FIG. 7 of the present application. In some embodiments, diffusion barrier layer 32 is omitted.

Figure 18:
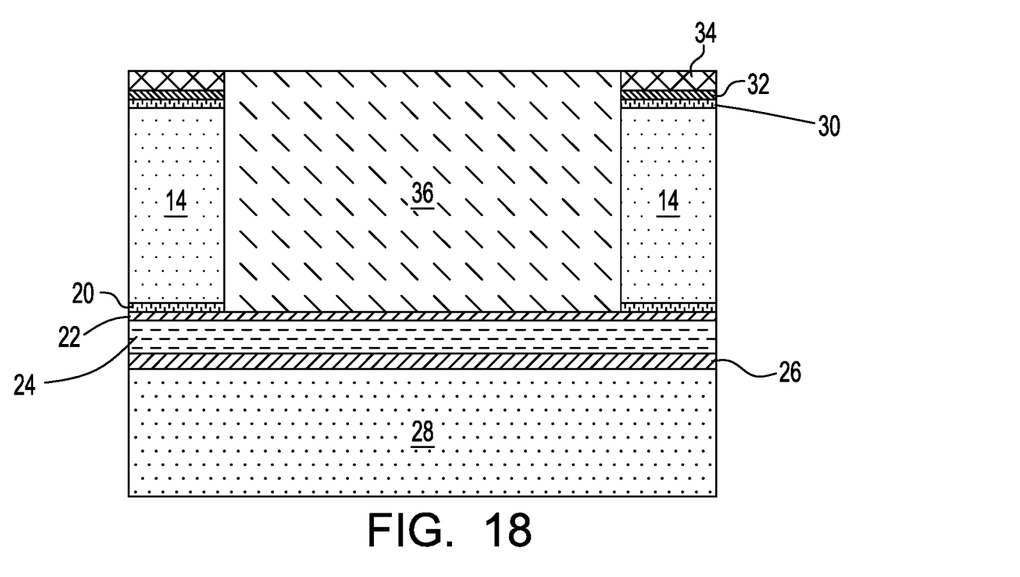
FIG. 18 is a cross sectional view of the exemplary structure of FIG. 17 after forming a cathode material within the vertical through hole.
Figure 19:
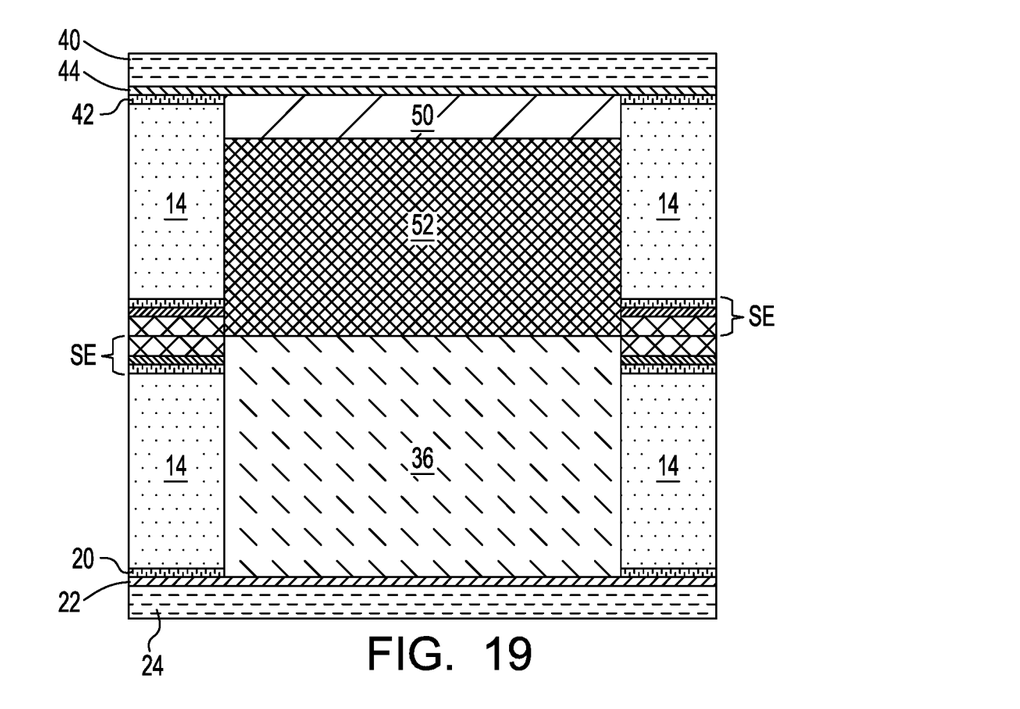
FIG. 19 is a cross sectional view of yet another micro-battery of the present application in which pre-cut glass bodies having vertical through holes are used in providing both the cathode side and the anode side of the micro-battery.

Referring now to FIG. 18, there is illustrated the another first exemplary structure of FIG. 17 after forming a cathode material 36 within the vertical through hole 16. The cathode material 36 of this embodiment may include one of the materials mentioned above for providing cathode material 36 to the first exemplary structure shown in FIG. 9 of the present application.

After removing the second handler substrate 28 from the another first exemplary structure shown in FIG. 18, the another first exemplary structure may then be bonded to a second exemplary structure as shown in FIG. 10 to provide a micro-battery as shown in FIG. 11A of the present application. At least one additional micro-battery can be stacked atop such as micro-battery structure to provide the stacked micro-battery structure shown in FIG. 11B.

In some embodiments not shown, a pre-cut glass body is used only on the anode side of the micro-battery. In such an embodiment, the anode side would formed utilizing the processing steps described above for the cathode side (except for replacing the cathode side materials with appropriate anode side materials) which are illustrated in FIGS. 1-10 or FIGS. 12-18, and then the cathode side would be formed utilizing the processing steps described above for the anode side (except for replacing the anode side materials with cathode side materials).

Referring now to FIG. 19, there is illustrated a yet another micro-battery of the present application in which pre-cut glass bodies 14 having vertical through holes are used in providing both the cathode side and the anode of the micro-battery. This exemplary micro-battery can be derived from the micro-batteries disclosed above. Notably, and addition to including two pre-cut glass bodies 14, this exemplary micro-battery includes two metallic sealing elements, SE, as defined above. In this embodiment, each metallic sealing element comprises a adhesion metal layer, a diffusion barrier layer, and a fusible metal or metal alloy layer, wherein the fusible metal or metal alloy layers are in direct contact each other and are bonded together. Additional micro-batteries having the same basic structure as shown in FIG. 19 can be stacked thereon.

In some embodiments, it is possible to provide a stacked micro-battery structure that includes at least one micro-battery as shown in FIG. 11A or FIG. 11A and at least one micro-battery as shown in FIG. 19.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A micro-battery comprising:
   a cathode side comprising a cathode current collector and a cathode material;
   an anode side comprising an anode current collector and an anode material;
   an electrolyte separator material located between the anode material and the cathode material, the electrolyte separator material includes an electrolyte; and
   a pre-cut glass body separating the cathode current collector from the anode current collector, wherein the pre-cut glass body includes at least one vertical through hole that laterally surrounds and houses either the cathode material or the anode material of the micro-battery.

2. The micro-battery of claim 1, further comprising a metallic sealing element and a sealing structure located between the pre-cut glass body and either the cathode current collector or the anode current collector, wherein the metallic sealing element and the sealing structure are bonded together.

3. The micro-battery of claim 2, wherein the metallic sealing element and the sealing structure are located between the pre-cut glass body and the anode current collector, and wherein the at least one vertical through hole houses the cathode material.

4. The micro-battery of claim 3, further comprising a diffusion barrier layer located between the cathode material and the cathode current collector.

5. The micro-battery of claim 2, wherein the sealing structure comprises a metal.

6. The micro-battery of claim 2, wherein the sealing structure comprises a polymeric material.

7. The micro-battery of claim 2, wherein the metallic sealing element comprises an adhesion metal layer, a diffusion barrier layer, and a fusible metal or metal alloy layer, wherein the fusible metal or metal alloy layer is in direct contact with the sealing structure.

8. The micro-battery of claim 2, wherein the pre-cut glass body, the sealing structure and the metallic sealing element are each ring shaped.

9. The micro-battery of claim 1, further comprising at least one other micro-battery stacked atop the micro-battery, wherein the at least one other micro-battery comprises:
   a cathode side comprising a cathode current collector and a cathode material;
   an anode side comprising an anode current collector and an anode material;
   an electrolyte separator material located between the anode material and the cathode material, the electrolyte separator material includes an electrolyte; and
   a pre-cut glass body separating the cathode current collector from the anode current collector, wherein the pre-cut glass body includes at least one vertical through hole that laterally surrounds and houses either the cathode material or the anode material of the at least one other micro-battery.

10. A micro-battery comprising:
    a cathode side comprising a cathode current collector and a cathode material;
    an anode side comprising an anode current collector and an anode material;
    an electrolyte separator material located between the anode material and the cathode material, the electrolyte separator material includes an electrolyte; and
    a pair of stacked pre-cut glass bodies separating the cathode current collector from the anode current collector, wherein one of pre-cut glass bodies includes at least one vertical through hole that laterally surrounds and houses the cathode material of the micro-battery, and another of the pre-cut glass bodies includes at least one vertical through hole that laterally surrounds and houses the anode material of the micro-battery.

11. The micro-battery of claim 10, further comprising a pair of metallic sealing elements located between the pair of stacked pre-cut glass bodies, wherein the pair of metallic sealing elements are bonded together.

12. The micro-battery of claim 11, wherein each of metallic sealing elements comprises an adhesion metal layer, a diffusion barrier layer, and a fusible metal or metal alloy layer, wherein the fusible metal or metal alloy layers of each metallic sealing element are in direct contact with each other.

13. The micro-battery of claim 11, wherein the pre-cut glass bodies and the metallic sealing elements are all ring shaped.

14. A method of forming a micro-battery, the method comprising:
    providing a cathode side comprising a cathode current collector and a cathode material, and an anode side comprising an anode current collector and an anode material, wherein at least one of the cathode side and the anode side includes a pre-cut glass body having at least one vertical through hole that laterally surrounds and houses a battery material and wherein an electrolyte separator material is located on the anode material, the electrolyte separator material includes an electrolyte; and bonding the cathode side to the anode side, wherein the battery material comprises the anode material or the cathode material and wherein the electrolyte separator material is located between the anode material and the cathode material.

15. The method of claim 14, wherein the cathode side includes the pre-glass body, and wherein a sealing element is formed on the pre-glass body prior to the bonding.

16. The method of claim 15, wherein the anode side comprises a sealing structure that houses said anode material.

17. The method of claim 16, wherein the pre-cut glass body and the sealing structure are each ring shaped.

18. The method of claim 14, wherein both the cathode side and the anode side includes pre-glass bodies and wherein a sealing element is formed on each pre-glass body prior to the bonding.

* * * * *